(12) United States Patent
Koengeter et al.

(10) Patent No.: US 10,112,464 B2
(45) Date of Patent: Oct. 30, 2018

(54) ROLL-UP TONNEAU COVER SYSTEM WITH GROOVED SIDE RAILS

(71) Applicant: Retrax Holdings, LLC, Grand Forks, ND (US)

(72) Inventors: Joseph J. Koengeter, Chelsea, MI (US); Lucas R. Spray, Grand Forks, ND (US); William R. Cohoon, Whitmore Lake, MI (US)

(73) Assignee: Retrax Holdings, LLC, Grand Forks, ND (US)

( * ) Notice: Subject to any disclaimer, the term of this patent is extended or adjusted under 35 U.S.C. 154(b) by 56 days.

(21) Appl. No.: 15/341,495

(22) Filed: Nov. 2, 2016

(65) Prior Publication Data

US 2018/0118002 A1     May 3, 2018

(51) Int. Cl.

| | |
|---|---|
| *B60J 7/04* | (2006.01) |
| *B60J 7/19* | (2006.01) |
| *B60J 10/277* | (2016.01) |
| *B60P 7/02* | (2006.01) |

(52) U.S. Cl.
CPC ............. *B60J 7/041* (2013.01); *B60J 7/196* (2013.01); *B60J 10/277* (2016.02); *B60P 7/02* (2013.01)

(58) Field of Classification Search
CPC ...... B60P 7/02; B60P 7/04; B60J 7/041; B60J 7/067; B60J 7/068; B60J 7/141; B60J 7/196; B60J 7/198; B60J 10/277
USPC ................................ 296/98, 100.03, 100.09
See application file for complete search history.

(56) References Cited

U.S. PATENT DOCUMENTS

| | | | |
|---|---|---|---|
| 4,479,677 A | 10/1984 | Gulette et al. | |
| 4,717,196 A * | 1/1988 | Adams | B60J 5/14 160/201 |
| 4,889,381 A * | 12/1989 | Tamblyn | B60J 7/068 160/133 |
| 5,040,843 A * | 8/1991 | Russell | B60J 7/068 160/133 |
| 5,251,950 A | 10/1993 | Bernardo | |
| 5,330,246 A * | 7/1994 | Bernardo | B60J 7/068 160/130 |
| 5,470,120 A * | 11/1995 | Christensen | B60R 9/00 224/405 |
| 5,860,691 A * | 1/1999 | Thomsen | B60J 7/08 296/100.18 |
| 6,113,176 A | 9/2000 | Bernardo | |
| 6,276,735 B1 * | 8/2001 | Champion | B60J 7/041 296/100.06 |

(Continued)

*Primary Examiner* — Gregory A Blankenship
(74) *Attorney, Agent, or Firm* — Harness, Dickey & Pierce, P.L.C.

(57) ABSTRACT

Side rails can include a longitudinally extending rail track having support surfaces and a plurality of longitudinally extending linear grooves. A storage housing can provide storage tracks in alignment with the forward end of the rail tracks. In addition, a roll-up tonneau cover can include a plurality of slats pivotally connected together. Corresponding first and second sides of the slats can be supported above the grooves on a respective one of the support surfaces of the rail tracks. The slats can be movable along the support surfaces between a storage arrangement wherein the slats are supported by the storage tracks to provide access to the cargo box, and a deployed arrangement wherein the slats are supported by the support surfaces of the rail tracks to cover the cargo box.

17 Claims, 8 Drawing Sheets

(56) References Cited

U.S. PATENT DOCUMENTS

| | | | | |
|---|---|---|---|---|
| 6,848,734 B1 * | 2/2005 | Mulvaney | ................ | B60J 7/085 |
| | | | | 160/133 |
| 9,399,391 B2 | 7/2016 | Bernardo et al. | | |
| 9,849,821 B1 * | 12/2017 | Copp | ........................ | B60P 7/02 |
| 2016/0280123 A1 | 9/2016 | Rohr et al. | | |
| 2017/0008382 A1 * | 1/2017 | Bernardo | ................ | B60J 7/085 |

\* cited by examiner

ROLL-UP TONNEAU COVER SYSTEM WITH GROOVED SIDE RAILS

FIELD

The present disclosure relates to roll-up tonneau cover systems for covering a cargo box of a pickup truck and, more particularly, to such systems including tonneau covers with slats that are movable along supporting side rails.

BACKGROUND

This section provides background information related to the present disclosure which is not necessarily prior art.

Trucks such as pickups having an open top cargo box can be a quite popular type of vehicle because the cargo box enables objects of various sizes to be placed therein and transported. Tonneau cover systems can be used to cover the top of cargo box in a deployed or closed arrangement to protect the contents against dirt, debris, and other environmental contaminants, and to improve the aesthetic quality thereof. In some cases, the tonneau covers can be formed of a plurality of slats hingedly coupled together so they can be rolled-up into a compact, storage, or open arrangement at the front of the cargo box, to allow access to the cargo box. For example, such tonneau covers can be supported in a storage housing positioned adjacent the forward end of the cargo box in the open arrangement.

When in the deployed or closed arrangement, tonneau covers can be supported on longitudinally extending ledges or surfaces of a pair of side rails coupled along the side walls of the pick-up truck. Different arrangements can be used to facilitate the tonneau cover moving along the side rail surfaces between the deployed and storage arrangements. For example, wheels that roll along the surfaces of the side rails can be coupled to the ends of the slats. As another example, the tonneau cover can engage against and slide along separate non-metallic components coupled to the metal side rails. Both of these options require additional components to facilitate the movement along the side rail surfaces.

One problem with conventional covers is that water that accumulates on the tracks, for example, due to washing the truck, or rain, or snow, or other environmental conditions, can interfere with travel of the slats along the rails. In addition, movement of the slats can cause unwanted splashing into the truck bed of excess water that has accumulated on the tracks, potentially damaging the cargo therein. Still further, during cold winter weather conditions, accumulated water on the tracks can freeze, causing the tonneau cover to bind during opening or closing. Thus, it is desired to improve water management of the rail tracks in tonneau covers having slats that slide or roll over the side rails.

SUMMARY

This section provides a general summary of the disclosure, and is not a comprehensive disclosure of its full scope or all of its features.

In one aspect of the present disclosure, a tonneau cover system for a truck cargo box including a forward end and a rear end, and first and second side walls therebetween can be provided. The tonneau cover system can include at least one side rails attachable along one of the side walls of the cargo box. The at least one side rail can have a forward end and can comprise a rail track having a support surface and a plurality of linear grooves extending longitudinally along the side rail. The system can include a storage track that is attachable adjacent the forward end of the cargo box with the storage track in alignment with the rail track. A roll-up tonneau cover can include a plurality of slats pivotally connected together and with first ends of the slats being supportable above the grooves of the rail track on the support surface. The tonneau cover can be movable along the support surfaces between a storage arrangement wherein the slats are supported by the storage tracks to provide access to the cargo box, and a deployed arrangement wherein the slats are supported by the support surfaces to cover the cargo box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As depicted throughout the figures, an example of a tonneau cover system for a truck bed or cargo box 11 of the present disclosure is generally indicated at 20. In some cases, the truck bed or cargo box 11 can be part of a pickup truck 13 as shown. Briefly, the cargo box 11 can comprise a lateral or transverse forward or front wall 15 and a lateral or transverse rear wall or tailgate 17 with a pair of opposing longitudinal side walls 19 extending therebetween.

The tonneau cover system 20 can include a tonneau cover 22 and a pair of side rails 24 for coupling to and along the side walls 19 of the truck box 11. The tonneau cover 22 can include a plurality of slats 26 hingedly coupled together and supportable on the side rails 24 when the side rails 24 are coupled to the side walls 19 of a cargo box 11. The truck bed system can additionally include a storage track 44, which can be provided as part of a storage housing 28 for coupling to the cargo box 11 adjacent its forward wall 15 to receive the tonneau cover in an open, storage arrangement shown in FIG. 2.

Figure 1:
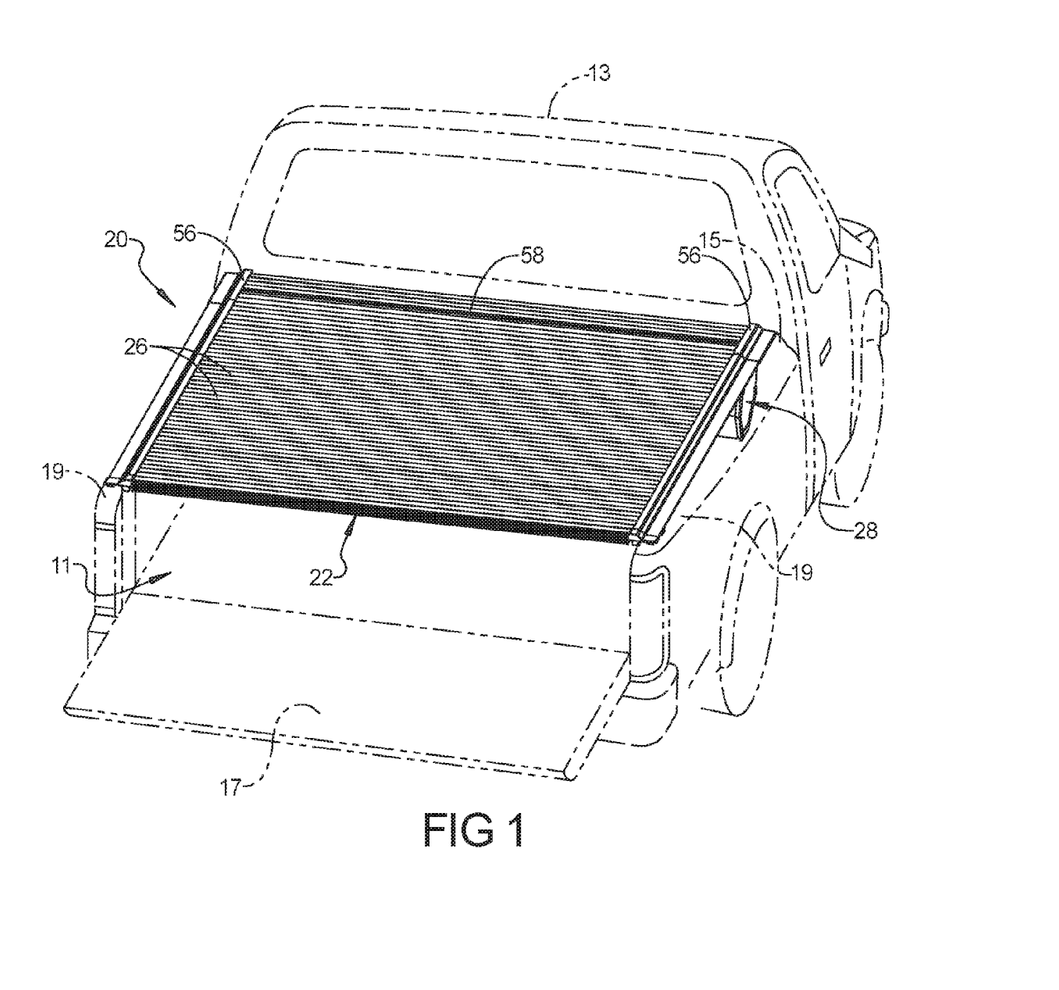
FIG. 1 is a perspective view of an example tonneau cover system in accordance with the present disclosure, illustrated in a closed or deployed arrangement over a truck box of a pickup truck (shown in dashed lines).
Figure 2:
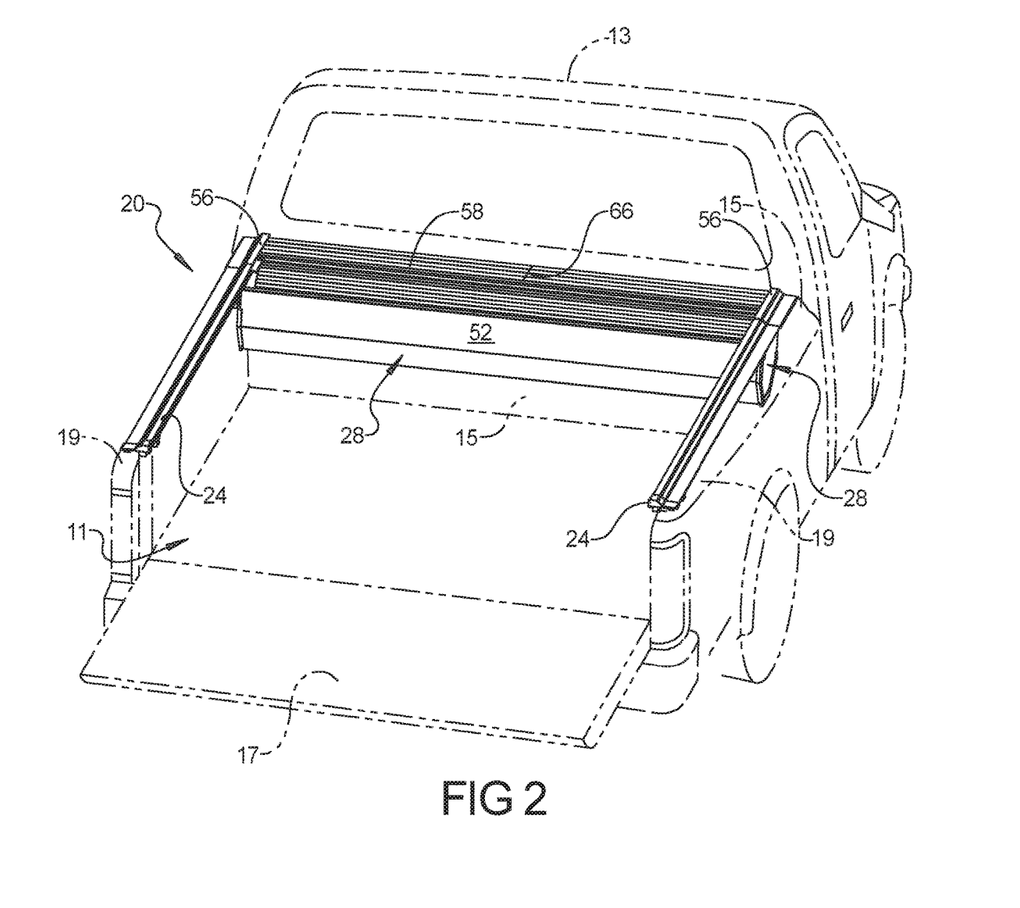
FIG. 2 is a perspective view similar to FIG. 1, but with the tonneau cover illustrated in an open or storage arrangement.

FIG. 1 illustrates an example tonneau cover system 20 in a closed, deployed arrangement. FIG. 2 illustrates the example tonneau cover system 20 in the open, storage arrangement. In the example embodiments, the tonneau cover 22 engages and moves along a supporting surface or rail track 30 of the side rails 24. The rail track 30 can comprise a plurality of support surfaces or contact areas 32 separated by linear grooves 34. Thus, the slats 26, comprising extruded bodies 36 and end caps 40, of the tonneau cover 22 are engaged directly against and supported on the rail tracks 30 as the tonneau cover 22 moves along the side rails 24 between the open and closed arrangements. In other words, these side rail tracks 30 provide multiple supporting engagement or direct contact areas or support surfaces 32 between the side rail 24 and the tonneau cover 22.

In some embodiments, the side rails 24 can include a longitudinally extending gutter 74 along the outboard side of the support surfaces of the rail track 30. In some embodiments, the side rails 24 can be extruded metal or plastic members, such that the rail track 30, including the grooves 34 and the contact areas or support surfaces 32, are all part of a one-piece component. Thus, the grooves 34 and contact areas 32 can extend the entire longitudinal length of the side rails 24. Such a one-piece component can additionally include any combination of the additional side rail features described below, such as the longitudinally extending water retention lip 60, the storage housing coupling channel 54, the side wall contacting leg 72, and the top wall 46.

Figure 3:
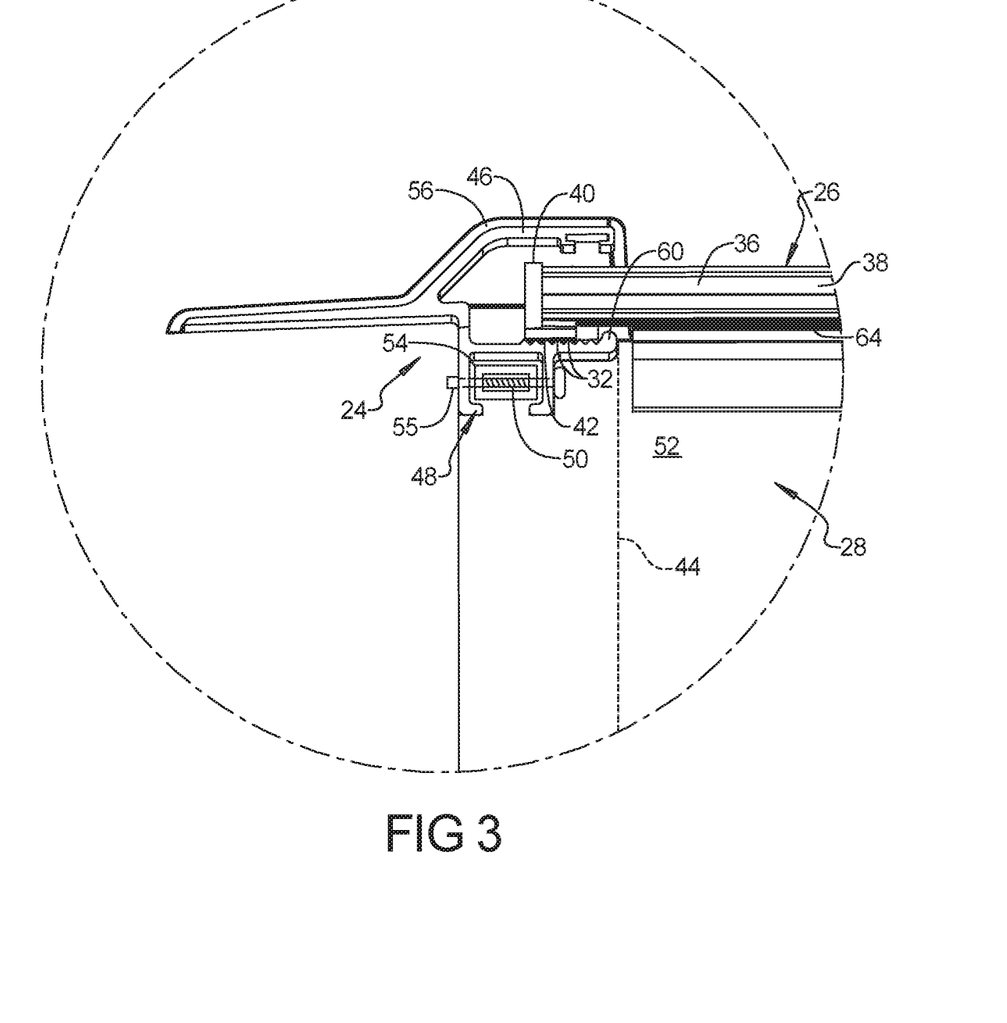
FIG. 3 is a partial cross sectional view of one example tonneau cover system showing a tonneau cover supported by, and slidable along, side rails.
Figure 4:
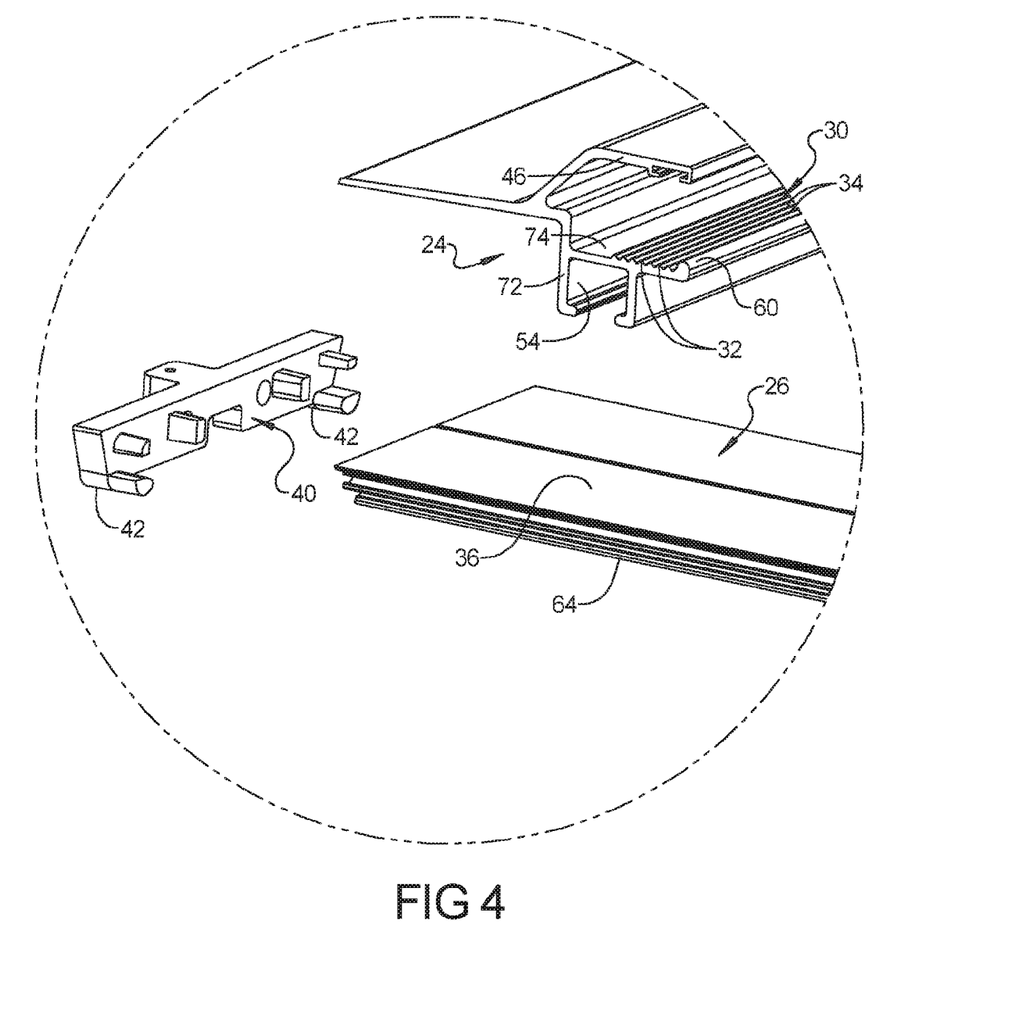
FIG. 4 is a perspective view of components of FIG. 3.

As in the example embodiment of FIGS. 3 and 4, the grooves 34 can have a triangular or V-shaped cross-sectional shape. Similarly, the rail tracks 30 can comprise a plurality of support contact areas 32 provided by triangular or inverted-V cross-sectionally shaped portions with slightly rounded points 32. Water from the exterior environment that finds its way to the rail tracks 30 will flow down into the grooves 34, where it can be managed. For example, the grooves 34 can guide the water into the storage housing 28, which can further guide the water out of the truck box 11. Thus, any potential negative impact of water on the opening and closing of the tonneau cover system 20 can be reduced.

In some embodiments, each slat 26 of the tonneau cover 22 can include an extruded metal body 36 and end caps 40. The extruded metal body 36 can include a central, longitudinally extending channel 38, and the end caps 40 can be coupled to each end of the channel 38 along each side of the slats 26. The end caps 40 can provide the slats 26 with cooperating support surfaces 42 that engage against respective contact areas 32 between the grooves 34 of the rail tracks 30 of the side rails 24. Thus, the slats 26 can be supported by engagement between the contact areas or support surfaces 32 of the rail tracks 30 and the cooperating support surfaces 42 of the end caps 40 as the tonneau cover 22 slides along the side rails 24 between the deployed and storage arrangements. The grooves 34 can provide reduced sliding friction between the contacting surfaces 32 and 42. The end caps 40 can be constructed of a polymer material that slides relatively easily and smoothly along the metal material of the side rails 24.

In some embodiments, each side rail 24 can include a water retention lip 60 positioned inboard, adjacent and extending above the rail track 30 or support surface 32. The end caps 40 can provide cooperating support surfaces 42 that engage directly against and slide along the support surfaces 32 of the side rails 24. The cooperating support surfaces 42 can be positioned below a lower adjacent surface 64 of the slats 26 a distance that is sufficient to space the lower adjacent surface 64 above the inboard water retention lip 60. Thus, a space or gap is provided between the water retention lip 60 and the slats 26 when the cooperating support surfaces 42 of the slats 26 are engaged against the support surfaces 32 of the side rails 24.

As in this example embodiment noted above, water present on the contact areas or support surfaces 32 of the rail tracks 30 will be reduced as a result of the longitudinal grooves 34 extending along the rail tracks 30. Thus, any potential negative impact of water on the opening and closing of the tonneau cover system 20 can be essentially eliminated. For example, not only do the grooves 34 essentially eliminate water resistance to the end caps 40 of the slats 26 sliding along the supporting surfaces 32, but also reduces the potential for water over the water retention lip 60 into the truck box 11 resulting from the end caps 60 sliding along the grooved track 29. In addition, during cold weather or winter conditions that might otherwise tend to cause accumulated excess water on the rail tracks 30, e.g., from rain or snow, to freeze and bind or obstruct the sliding of the end caps 40, the grooves 34 decrease water and ice accumulation; thereby reducing such binding restricting movement of the tonneau cover 22 between open and closed arrangements.

In some embodiments, the storage housing 28 can include left and right storage tracks 44. These storage tracks 44 can be aligned with respective rail tracks 30 of the side rails 24 to receive and guide the tonneau cover 22 as it comes off the side rails 24 and into the storage housing 28. The tracks 44 can be shaped to form the tonneau cover 22 into a space efficient configuration within the housing 28 when the tonneau cover 22 is in the storage arrangement. In the illustrated embodiment, for example, the storage tracks 44 can have a generally spiral configuration.

In some embodiments, the side rails 24 can additionally include a top wall 46 positioned a height distance above the contact areas or support surfaces 32 of the rail track 30. The end caps 40 of a forward slat 26 can have a corresponding height dimension that is greater than that of the more rearward slats 26, and that is greater than the height distance between the contact areas or support surfaces 32 of the rail track 30 and the top wall 46. Thus, the forward end of the top wall 46 of the side rails 24 can operate as a stop against which the end cap 40 of the forward slat 26 engages to prevent the tonneau cover 22 from moving past the deployed arrangement without adding to the overall number of components of the assembled system 20. In other words, the end caps 40 of a forward slat 26 can be enlarged relative to the end caps of more rearward slats 26, to prevent the tonneau cover 22 from sliding out of the storage track 44.

In some embodiments, the storage housing 28 can include a side rail coupling 48 for each side rail 24. For example, the side rail coupling 48 can be a rectangular protrusion 50 extending from a rearwardly-facing surface 52 of the storage housing 28. The protrusion 50 can be shaped to be received within a channel 54 of the side rail 24 having a corresponding shape. A fastener such as bolt 55 can extend through aligned apertures in the side rail 24 and the protrusion 50 to finalize the coupling 48 between the storage housing 28 and the side rail 24.

In some embodiments, a clamp (not shown) can include a coupling that rides within the channel 54, wherein the clamp can be used to couple the side rails 24 to downwardly extending flanges of the side walls 19 of the cargo box 11. Alternatively, the channel 54 can provide a side wall contacting leg 72 (FIG. 4) that can be clamped against downwardly extending flanges of the side walls 19 of the cargo box 11, or the side rails 24 can include a separate side wall contacting leg 72 (FIG. 5) that can be clamped against downwardly extending flanges of the side walls 19 of the cargo box 11.

In some embodiments, the storage housing 28 can include separate left and right side rail coverings 56. Each of the separate side rail coverings 56 covers an end of the respective side rail 24 coupled to the storage housing 28. Thus, the ability to see any misalignment or gap at the coupling 48 between the side rails 24 and the storage housing 28 is reduced as a result of these separate coverings 56, without the need to provide a full cover or top for the storage housing 28 that extends the entire distance between the side rails 24 where they are coupled to the storage housing 28. Thus, the forward to rear (width) dimension 66 of the storage housing cover 58 can be reduced.

Figure 5:
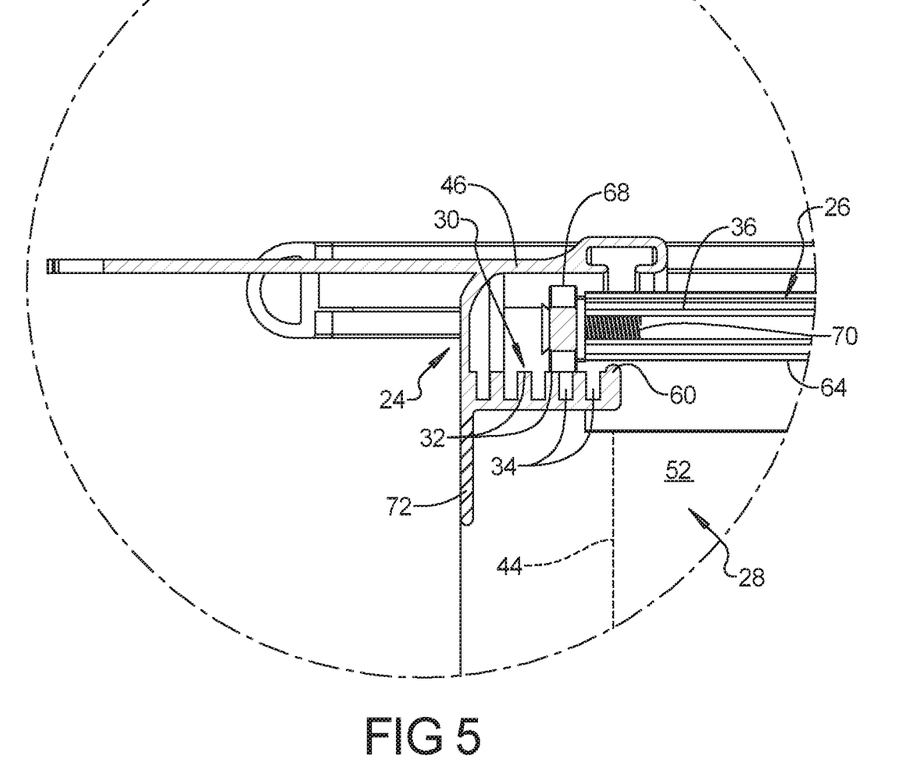
FIG. 5 is a perspective view of another example tonneau cover system with a tonneau cover supported by, and rollable along, side rails.
Figure 6:
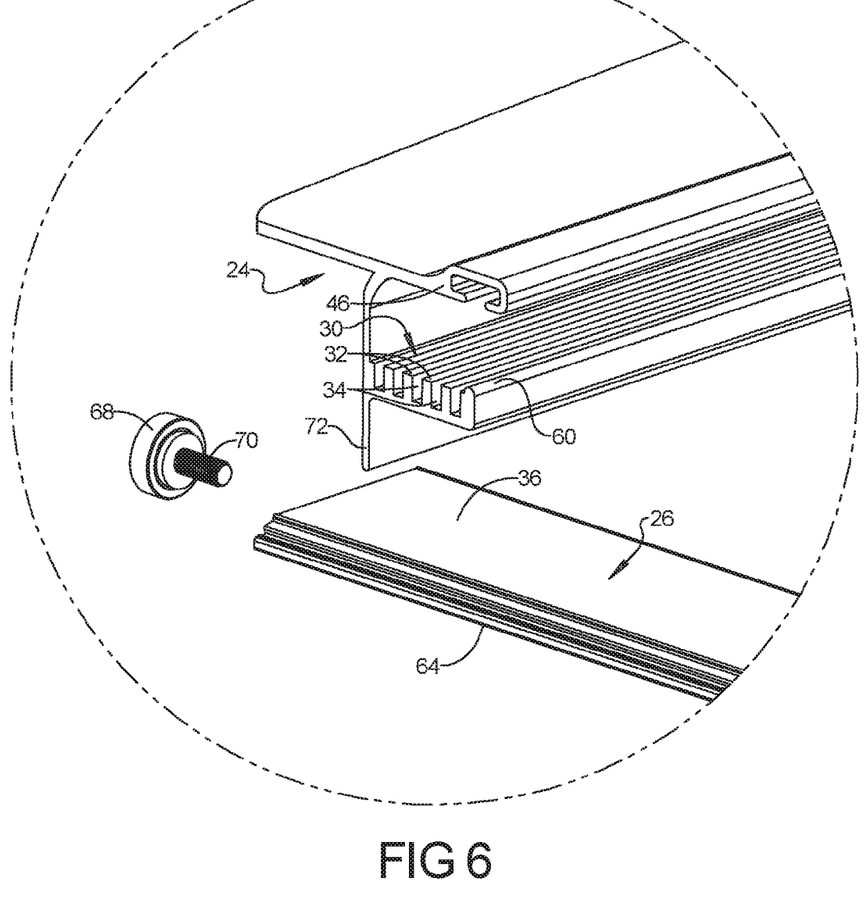
FIG. 6 is an enlarged partial exploded perspective view of various components of FIG. 5.
Figure 7:
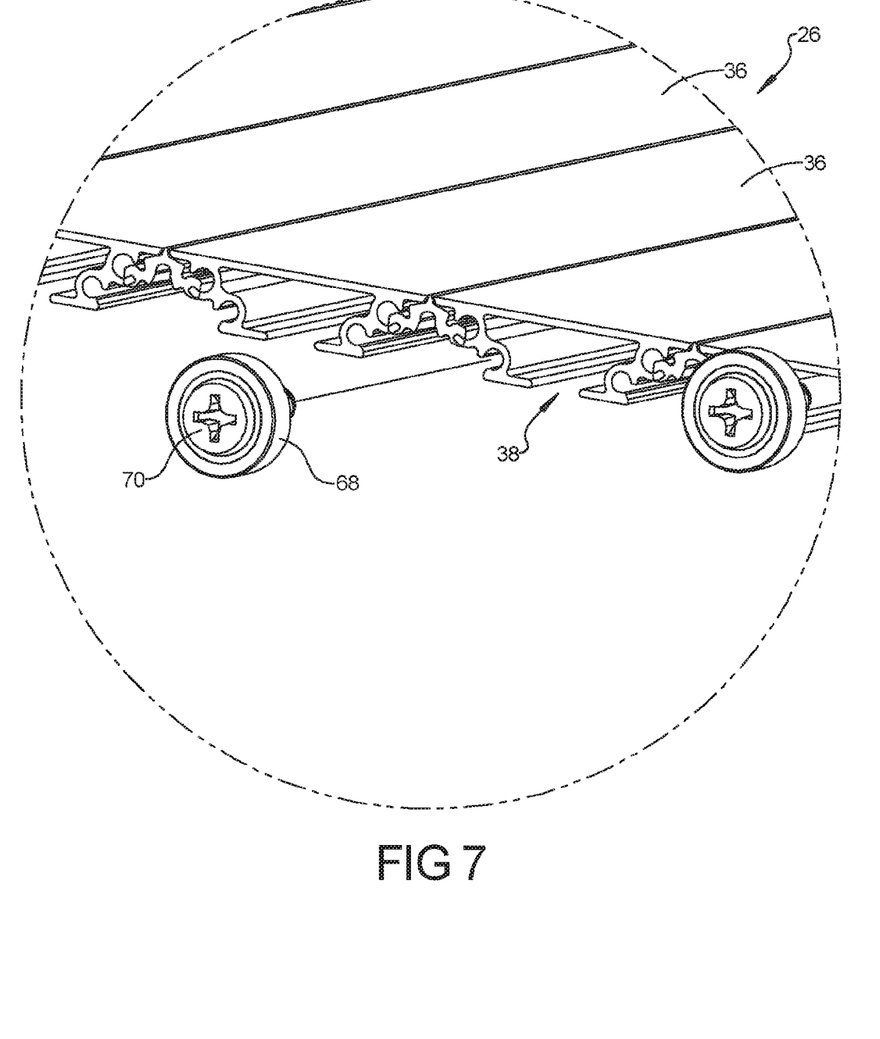
FIG. 7 is an enlarged partial perspective view of various components of FIG. 5.
Figure 8:
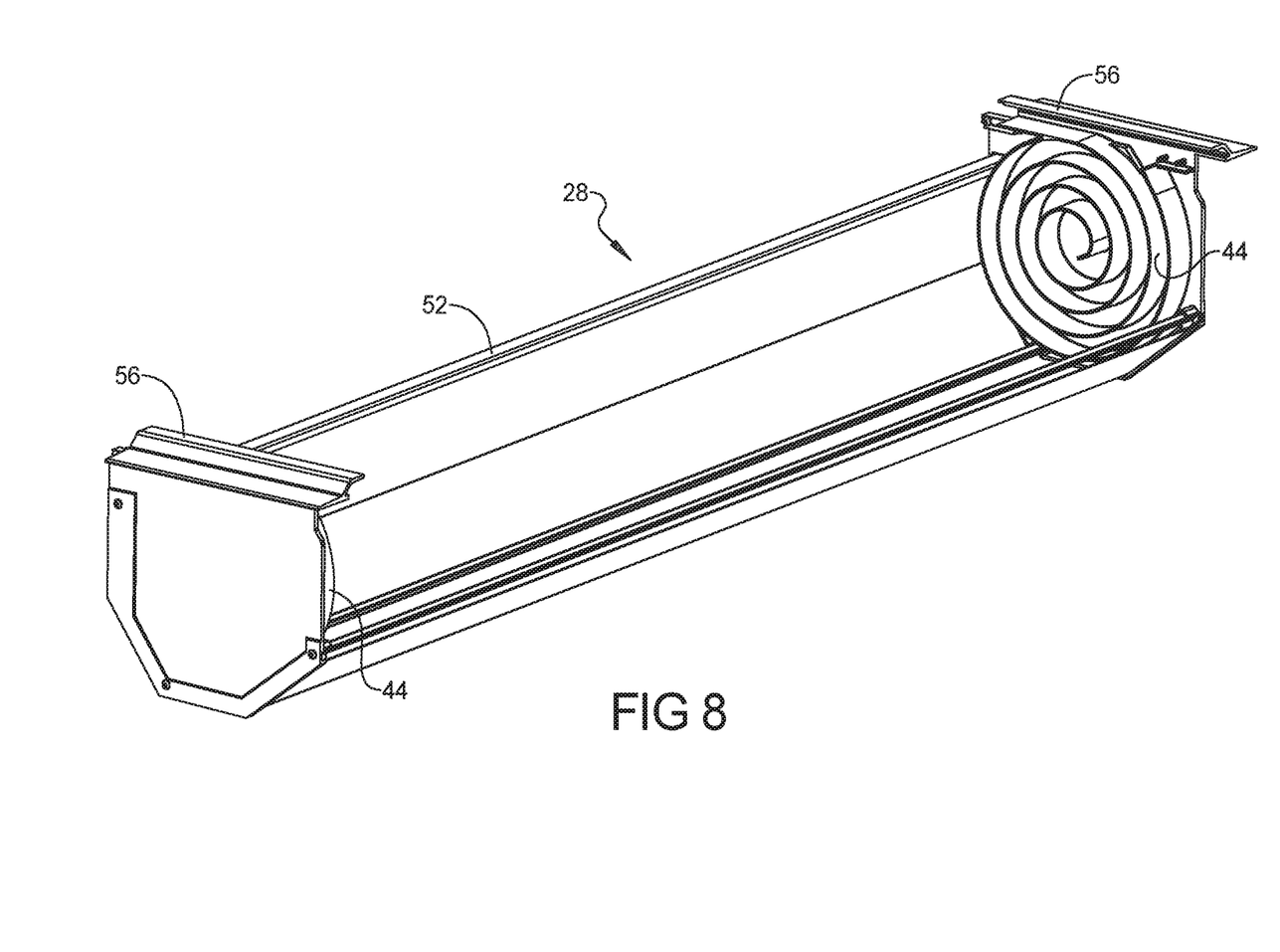
FIG. 8 is a perspective view of the storage tracks and storage housing of FIGS. 1 and 2.

Referring to the second example embodiment of FIGS. 5-7, the slats 26 can include wheels 68 along each side that roll along the support surfaces 32 of the side rails 24 as the tonneau cover 22 is moved between its deployed and storage arrangements. For example, the wheels 68 can be mounted on a threaded axle 70. The threaded axle 70 can be coupled to the extruded metal body 36 of the slats 26 directly as illustrated. Alternatively, the threaded axle 70 can be coupled to the extruded metal or plastic body 36 indirectly via the end caps 40 of this embodiment.

As in the example embodiment of FIGS. 5-7, the grooves 34 can have a rectangular cross-sectional shape. Similarly, the rail tracks 30 can comprise a plurality of rectangular support contact areas or surfaces 32 provided by rectangular cross-sectionally shaped portions. Water from the exterior environment that finds its way to the rail tracks 30 will flow down into the grooves 34, where it can be managed as described previously.

As in this example embodiment therefore, problematic water will not be present on the contact areas or support surfaces 32 of the rail tracks 30. Thus, any potential negative impact of water on the opening and closing of the tonneau cover system 20 can be reduced. For example, not only do the grooves 34 reduce water resistance to the wheels 68 rolling along the supporting surfaces 32, but it reduces the possibility of the rolling wheels 68 pushing water over the water retention lip 60 and into the truck box 11. In addition, the grooves 34 decrease formation of ice obstructions on the rail tracks 30 due to freezing of water; and therefore reduce binding restricting movement of the tonneau cover 22 between the open and closed arrangements under cold or winter conditions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a truck cargo box including a forward end and a rear end, and first and second side walls therebetween, the tonneau cover system comprising:

first and second side rails attachable along the first and second side walls, respectively, of the cargo box, each side rail having a forward end comprising a rail track having a support surface and a plurality of linear grooves extending longitudinally along the side rail, the support surface and grooves having corresponding triangular cross-sectional shapes, the support surface providing a plurality of contact surfaces, and a one-piece metal component forming the rail track, including the grooves, the support surfaces, and the contact surfaces;

a storage track attachable adjacent the forward end of the cargo box with the storage track in alignment with the rail track;

a roll-up tonneau cover comprising a plurality of slats pivotally connected together, each slat having first and second end caps including a bearing surface that engages directly against the contact surfaces of the support surface of the first and second side rails, respectively, and a one-piece polymer component forming each end cap, including the bearing surface, and the bearing surface of the end caps being slidable against and along the contact surfaces of the support surfaces between a storage arrangement in which the slats are supported by the storage tracks to provide access to the cargo box, and a deployed arrangement in which the slats are supported by the support surfaces to cover the cargo box.

2. The tonneau cover system of claim 1, wherein the contact surfaces of the support surface of the side rails are provided by slightly rounded points of the corresponding triangular shapes forming the support surfaces.

3. The tonneau cover system of claim 1, wherein the storage tracks are incorporated into a storage housing.

4. The tonneau cover system of claim 3, wherein the storage housing includes first and second side rail couplings protruding from a rearwardly-facing surface of the storage housing.

5. The tonneau cover system of claim 1, wherein each side rail further comprises a longitudinally extending water retention lip positioned inboard, adjacent and extending higher than the support surface of the rail track.

6. The tonneau cover system of claim 5, wherein the slats comprise a lower face surface adjacent the end caps, and wherein the bearing surfaces are positioned below the lower face surface of the slats by a distance sufficient to space the lower face surface above the water retention lip.

7. The tonneau cover system of claim 1, wherein the slats comprise extruded bodies with the end caps being coupled to the extruded bodies.

8. A tonneau cover system for a truck cargo box including a forward end and a rear end, and first and second side walls therebetween, the tonneau cover system comprising:

at least one side rail attachable along one of the side walls of the cargo box, the at least one side rail having a forward end comprising a rail track having a support surface and a plurality of linear grooves extending longitudinally along the side rail;

a storage track attachable adjacent the forward end of the cargo box with the storage track in alignment with the rail track;

a roll-up tonneau cover comprising a plurality of slats pivotally connected together and with first ends of the slats being supportable above the grooves of the rail track on the support surface, and being movable along the support surfaces between a storage arrangement wherein the slats are supported by the storage tracks to provide access to the cargo box, and a deployed arrangement wherein the slats are supported by the support surfaces to cover the cargo box;

wherein the at least one side rail comprises two side rails and the storage track comprises two storage tracks, and wherein the side rails additionally comprise a top wall positioned a height distance above the support surfaces of the rail tracks, and wherein the slats include a forward slat having end caps with a corresponding height dimension that is greater than the height distance between the support surface and the top wall and is greater than the height dimension of end caps of other slats, and further wherein engagement of the end caps of the forward slat against the top wall prevents complete removal of the tonneau cover from the storage tracks.

9. The tonneau cover system of claim 8, wherein the storage tracks are incorporated into a storage housing.

10. The tonneau cover system of claim 9, wherein the storage housing includes first and second side rail couplings protruding from a rearwardly-facing surface of the storage housing.

11. The tonneau cover system of claim 8, wherein the slats comprise wheels that engage and roll along the support surfaces and above the grooves of the rail tracks of the side rails.

12. The tonneau cover system of claim 11, wherein the slats comprise extruded bodies with the wheels being coupled to the extruded bodies.

13. The tonneau cover system of claim 11, wherein each side rail further comprises a longitudinally extending water retention lip positioned inboard, adjacent and extending higher than the support surface of the rail track, and further wherein the wheels have a radius, and the slats comprise a lower face surface adjacent the wheels, and wherein the radius of the wheels is sufficient to position the lower face surface of the slats above the water retention lip.

14. The tonneau cover system of claim 8, wherein the support surfaces comprise a plurality of metal parallel support surfaces spaced apart by the grooves, of the rail tracks, and wherein the grooves and the support surfaces have corresponding triangular cross-sectional shapes.

15. The tonneau cover system of claim 14, wherein the metal parallel support surfaces of the side rails are provided by slightly rounded points of the corresponding triangular shapes of the support surfaces.

16. The tonneau cover system of claim 14, wherein the slats include slats rearward of the forward slat that include end caps that comprise polymer bearing surfaces that engage directly against the metal parallel support surfaces, and wherein the polymer bearing surfaces of the end caps are slidable against and along the metal parallel support surfaces between the storage arrangement and the deployed arrangement.

17. The tonneau cover system of claim 16, wherein a one-piece metal component forms the rail track, including the grooves and the metal parallel support surfaces, and wherein a one-piece polymer component forms each end cap, including the polymer bearing surface.

* * * * *